US012785750B2

(12) United States Patent
Deuse-Kleinsteuber et al.

(10) Patent No.: US 12,785,750 B2
(45) Date of Patent: Nov. 3, 2026

(54) TRANSMISSION SYSTEM AND TRANSMISSION METHOD FOR TRANSMITTING DATA AND ENERGY VIA A TWO-WIRE LINE

(71) Applicant: Phoenix Contact GMBH & Co. KG, Blomberg (DE)

(72) Inventors: Johannes Deuse-Kleinsteuber, Detmold (DE); Elmar Schaper, Luedge (DE); Peter Scholz, Brakel (DE); Christian Reinhold, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 65 days.

(21) Appl. No.: 18/688,220

(22) PCT Filed: Aug. 25, 2022

(86) PCT No.: PCT/EP2022/073702
§ 371 (c)(1),
(2) Date: Feb. 29, 2024

(87) PCT Pub. No.: WO2023/031017
PCT Pub. Date: Mar. 9, 2023

(65) Prior Publication Data
US 2024/0380430 A1 Nov. 14, 2024

(30) Foreign Application Priority Data
Sep. 3, 2021 (LU) ........................................ 500617

(51) Int. Cl.
*H04B 3/20* (2006.01)

(52) U.S. Cl.
CPC ....... *H04B 3/20* (2013.01); *H04B 2203/5412* (2013.01); *H04B 2203/5416* (2013.01)

(58) Field of Classification Search
CPC .......... H04B 3/542; H04B 3/548; H04B 3/54; H04B 3/20; H04B 2203/5412; H04B 2203/5416; H04L 12/10; H04L 12/40045
See application file for complete search history.

(56) References Cited

U.S. PATENT DOCUMENTS

| | | | | |
|---|---|---|---|---|
| 8,098,684 | B2 | 1/2012 | Schopfer et al. | |
| 10,541,726 | B1 * | 1/2020 | Ding | H04B 3/548 |

(Continued)

FOREIGN PATENT DOCUMENTS

| | | | |
|---|---|---|---|
| DE | 102016118004 | A1 | 3/2018 |
| DE | 112017004230 | T5 | 5/2019 |

(Continued)

OTHER PUBLICATIONS

International Search Report for corresponding PCT Application No. PCT/EP2022/073702 dated Oct. 25, 2022.

(Continued)

*Primary Examiner* — Aristocratis Fotakis
(74) *Attorney, Agent, or Firm* — Caesar Rivise, PC

(57) ABSTRACT

In examples, a transmission system for transmitting data and energy, with a master-module, at least one slave-module, and a two-wire line between the master-module and the slave-module for bidirectional data transmission between the master-module and the slave-module and for energy transmission from the master-module to the slave-module. Examples provide for the transmission system to be switchable be-tween several operating states, the operating states preferably differing with regard to energy transmission and/or with regard to data transmission. Furthermore, examples include an adapted master-module, a slave-module and an associated operating method.

24 Claims, 9 Drawing Sheets

(56) References Cited

U.S. PATENT DOCUMENTS

| | | | | |
|---|---|---|---|---|
| 11,030,137 | B2 | 6/2021 | Teutenberg et al. | |
| 2016/0313407 | A1* | 10/2016 | Towne | G01R 33/07 |
| 2018/0060269 | A1 | 3/2018 | Kessler | |
| 2019/0251054 | A1* | 8/2019 | Teutenberg | G06F 13/362 |
| 2020/0235949 | A1* | 7/2020 | Jones | H04B 3/54 |
| 2020/0304172 | A1 | 9/2020 | Yano | |
| 2021/0203380 | A1* | 7/2021 | Lee | H04B 3/02 |
| 2021/0250063 | A1* | 8/2021 | Kwon | H02J 50/80 |
| 2022/0060033 | A1* | 2/2022 | Bang | H02J 7/663 |
| 2022/0222063 | A1* | 7/2022 | Bang | G06F 8/65 |
| 2022/0294492 | A1* | 9/2022 | Fleischhacker | H04B 3/544 |

FOREIGN PATENT DOCUMENTS

| | | | |
|---|---|---|---|
| DE | 102019215201 | A1 | 4/2021 |
| EP | 1982433 | B1 | 4/2014 |
| EP | 2887588 | A1 | 6/2015 |
| EP | 2991270 | B1 | 6/2017 |
| EP | 3236615 | B1 | 8/2018 |
| EP | 2866354 | B1 | 6/2019 |
| EP | 2827222 | B1 | 10/2019 |
| EP | 3048536 | B1 | 2/2020 |

OTHER PUBLICATIONS

Umehara et al., “Controller Area Network and Its Reduced Wiring Technology”, IEICE Trans. Commun., vol. E102-B, No. 7, pp. 1248-1262, Jul. 2019.

Dwelley, D., Presentation: “A Quick Walk Around the Block”, Verison 1.1, IEEE P802.3bu Power over Data Lines Tutorial, Nov. 2015, Plenary.

Gardner, A., Presentation: “Serial Communication Classification Protocol (SCCP) for PODL”, Linear Technology Corp.

“Single Pair Ethernet for More Continuity”, Mouser Electronics.

“Power Over Ethernet”, Wikipedia.

“PowerLan”, Wikipedia.

* cited by examiner

TRANSMISSION SYSTEM AND TRANSMISSION METHOD FOR TRANSMITTING DATA AND ENERGY VIA A TWO-WIRE LINE

CROSS-REFERENCE TO RELATED APPLICATIONS

This application is a U.S. National Phase Application of PCT/EP2022/073702, filed Aug. 25, 2022, which claims priority to LU 500617, filed Sep. 3, 2021, the contents of which are incorporated herein by reference in their entireties for all purposes.

BACKGROUND OF THE INVENTION

The invention relates to a transmission system and a transmission method for transmitting data and energy via a two-wire line between a master-module and one or more slave-module(s). Furthermore, the invention relates to a master-module configured for this purpose and a slave-module configured for this purpose.

The invention relates to the transmission of energy and data via a two-wire line between a master-module and at least one slave-module, wherein the data transmission takes place bidirectional and the transmission system should be as cost-effective and simple as possible. In the prior art, two transmission methods are essentially known for this purpose, which are briefly described below.

FIG. 1 shows a known transmission system with a master-module 1 and a slave-module 2, which are connected to each other via a two-wire line 3. The master-module 1 contains an energy source 4 and a data interface 5. Accordingly, the slave-module 2 also contains an energy sink 6 and a data interface 7. The data signal to be transmitted can be modulated onto a carrier frequency and transmitted between the master-module 1 and the slave-module 2 via the two-wire line 3, wherein the data signal can be superimposed on an impressed DC voltage, as is the case in FIG. 1.

One disadvantage is that only point-to-point connections are possible in this way, i.e. it is not possible to connect further slave-modules to the master-module 1 in addition to the slave-module 2. Finally, a further disadvantage of this technical solution is that complex and relatively large components are required, such as inductivities and integrated circuits (ICs).

Another well-known technical solution is to modulate the data signal using a carrier frequency, which is known as "power line communication".

The initial disadvantage of this known technical solution ("power line communication") is that complex hardware is required on both the transmitter and receiver sides, which contains integrated circuits (ICs) and analog filters consisting of capacitors and inductivities, for example, making the transmission system expensive and requiring a relatively large amount of space on a circuit board.

The invention is therefore based on the problem of creating a transmission system or transmission method, respectively, that is optimized in accordance with the above-mentioned disadvantages. In addition, the invention is also based on the problem of creating a correspondingly optimized master-module and a correspondingly improved slave-module.

SUMMARY OF THE INVENTION

This problem is solved by the technical solution according to the independent claims.

The transmission system according to the invention initially comprises a master-module, at least one slave-module and a two-wire line between the master-module and the slave-module, in accordance with the known technical solution described at the beginning. On the one hand, the transmission system according to the invention enables a bidirectional data transmission between the master-module and the slave-module, as is already known per se from the prior art. On the other hand, the transmission system according to the invention also enables an energy transmission from the master-module to the slave-module.

The transmission system according to the invention now differs from the prior art in that the transmission system can be switched between several operating states, the various operating states preferably differing with regard to energy transmission and/or with regard to data transmission.

For example, the transmission system according to the invention can be operated in a first operating state in order to transmit energy from the master-module to the at least one slave-module via the two-wire line, which can also be referred to as the energy transmission phase.

In this first operating state (energy transmission phase), no data transmission from the master-module to the slave-module is possible in the preferred embodiment of the invention. However, the invention is not limited to such embodiments in which only energy transmission takes place in the first operating state, but no data transmission. Rather, it is also possible in principle that also a data transmission takes place during energy transmission from the master-module to the slave-module.

In a second operating state of the transmission system, on the other hand, a data transmission from the master-module to the at least one slave-module via the two-wire line can take place, which can also be referred to as the "downlink-broadcast-phase".

In this second operating state (downlink-broadcast-phase), in the preferred embodiment of the invention no energy transmission takes place from the master-module to the at least one slave-module, so that the energy supply to the slave-module is then ensured by an energy store in the slave-module, as will be described in detail.

In this second operating state (downlink-broadcast-phase), in the preferred embodiment of the invention, the data transmission takes place only in one direction, namely from the master-module to the slave-module. During this second operating state, on the other hand, generally no data transmission takes place in the opposite direction from the slave-module to the master-module.

In addition, the transmission system according to the invention can also be operated in a third operating state, in which a data transmission takes place from the slave-module to the master-module, which can also be referred to as the "uplink-phase".

In this third operating state ("uplink-phase"), an energy transmission can also take place simultaneously from the master-module to the at least one slave-module. For example, the data transmission from the slave-module to the master-module can take place by a so-called load modulation of the current drawn by the slave-module from the master module via the two-wire line, wherein this load current can then also simultaneously ensure the power supply of the slave-module, as will be described in detail.

In this third operating state ("uplink-phase"), however, the data transmission takes place in only one direction, namely from the slave-module to the master-module, but not in the opposite direction from the master-module to the slave-module in the preferred embodiment.

It has already been briefly mentioned above that the transmission system according to the invention differs from the known transmission system described at the beginning in that the transmission system according to the invention can be switched between several operating states. In the preferred embodiment of the invention, the transmission system can be switched between the three different operating states described above, which may also be referred to as the energy transmission phase, the downlink-broadcast-phase and the uplink-phase. However, the invention also claims protection for such transmission systems in which only switching between two operating states takes place, for example between the energy transmission phase and the downlink-broadcast-phase, between the energy transmission phase and the uplink-phase or between the downlink-broadcast-phase and the uplink-phase.

In the preferred embodiment of the invention, the energy transmission from the master-module to the at least one slave-module is temporarily interrupted in the second operating state during the data transmission from the master-module to the slave-module, as briefly mentioned above. During this interruption of the energy transmission, the slave-module therefore requires its own energy supply in order to maintain the operation of the slave-module during the interruption of the energy supply by the master-module. For this purpose, the slave-module can comprise its own energy store in order to supply the slave-module with the energy required for operation during the interruption of the energy transmission from the master-module in the second operating state. For example, this energy store can comprise a capacitor.

It is advantageous here if the slave-module comprises a discharge protection in order to prevent excessive discharge of the energy store during the interruption of the energy transmission from the master-module in the second operating state. For example, this discharge protection can comprise a diode, which is connected in series with the energy store (e.g. capacitor).

The data transmission from the slave-module to the master-module can, for example, take place by means of load modulation, as is known from the state of the art. The slave-module draws a load current from the master-module via the two-wire line, so that the modulation of this load current enables the transmission of data from the slave-module to the master-module.

To enable this load modulation, the slave-module preferably comprises a current modulator in order to modulate the load current drawn from the master-module via the two-wire line according to the data to be transmitted. The master-module then comprises correspondingly a current demodulator in order to demodulate the load current drawn from the slave-module via the two-wire line and to determine the data contained therein.

The load modulator in the slave module can, for example, comprise a current pulse generator that modulates the load current drawn via the two-wire line in the form of pulses so that the load current comprises current pulses corresponding to the data to be transmitted.

With the load modulation in the slave-module, it is also possible that the slave-module comprises several current pulse generators that are connected in parallel in order to be able to generate different current pulses of the load current. For example, the different current pulses can differ in their amplitude. The one of the current pulses can then be used for data transmission, while the other current pulses can form a warning signal or an interrupt signal, for example.

The current pulse generator in the slave-module can, for example, comprise a controllable switching element that is connected between the two lines of the two-wire line in order to modulate the load current that is drawn from the master module via the two-wire line. For example, the switching element can be a transistor, such as a bipolar transistor.

In addition, the current pulse generator in the slave-module can comprise a current limiter in order to limit the load current when the switching element (e.g. transistor) switches through. For example, the current limiter can consist of a collector resistor on the transistor, which limits the load current.

Furthermore, the current pulse generator in the slave-module preferably comprises a microprocessor for controlling the switching element corresponding to the data to be transmitted.

In the case of a pulsed data transmission, the current demodulator in the master-module preferably comprises a current pulse detector to detect the current pulses of the load current.

For example, the current pulse detector in the master-module can comprise a filter in order to pass through the rapidly varying current changes of the load current caused by the information-containing current pulses, whereas the slowly varying current changes of the load current are attenuated. This filter is preferably configured as a high-pass or band-pass filter and outputs a correspondingly filtered load current signal on the output side.

In addition, the current pulse detector in the master-module preferably comprises an amplifier to amplify the load current signal filtered by the filter.

Furthermore, the current pulse detector in the master-module can comprise a detector in order to compare the load current signal with at least one predetermined level. The detector is preferably configured as a digital detector and contains preferably a comparator.

Furthermore, the current pulse detector in the master-module can comprise a pre-state memory in order to store temporarily a pre-state of the load current, wherein the comparator then compares the current state of the load current signal with the pre-state of the load current signal stored in the pre-state memory.

It has already been mentioned above that the transmission system according to the invention also enables data transmission from the master-module to the slave-module. For this purpose, the master-module preferably contains a controllable switch (e.g. transistor) for switching the energy transmission from the master-module to the at least one slave-module during the data transmission from the master-module to the at least one slave-module. The switch can therefore modulate the supply voltage provided to the slave-module, for example by a clocked switch-off, which enables a pulse transmission from the master-module to the slave-module. However, it is not necessary for the energy transmission to be switched off completely. Rather, it is also possible that the energy transmission from the master-module to the slave-module is only attenuated during the data transmission.

However, the data transmission from the master-module to the slave-module can also be carried out by a separate output circuit that generates voltage pulses on the two-wire line corresponding to the data to be transmitted.

In addition, the master-module preferably also contains a microprocessor for providing the data to be transmitted to the slave-module and for controlling the transistor or the output circuit, respectively, corresponding to the data to be transmitted to the slave module.

To receive the data from the master-module, the slave-module preferably comprises a voltage detector in order to detect the voltage pulses transmitted by the master-module via the two-wire line. For example, this voltage detector can comprise a transistor, such as a bipolar transistor with an upstream base resistor and an emitter resistor.

In general, it should be mentioned that in the transmission system according to the invention, the master-module and the at least one slave-module can have a common electrical reference potential.

A further advantage of the transmission system according to the invention is that the transmission system can be configured as a bus system, so that several slave-modules connected in parallel can be connected to the master-module via the two-wire line. This also distinguishes the transmission system according to the invention from the known transmission system described at the beginning, in which only a single-slave module can be connected to the master-module. The invention is therefore not limited to a specific number of slave-modules with regard to the number of slave-modules connected to the master-module.

The transmission system according to the invention has been described above, which comprises both the master-module and the slave-module and also the two-wire line for connecting the master-module to the slave-module. However, the invention also claims independent protection for a correspondingly configured master-module and for a correspondingly configured slave-module. The scope of protection of the invention is therefore not limited to the complete transmission system including master-module, slave-module and two-wire line, but also includes their individual components (master-module and slave-module).

Finally, the invention also comprises a corresponding transmission method, the details of the transmission method according to the invention already being apparent from the above description of the transmission system according to the invention, so that a separate description of the transmission method according to the invention can be dispensed with.

BRIEF DESCRIPTION OF THE DRAWINGS

Other advantageous embodiments of the invention are characterized in the sub claims or are explained in more detail below together with the description of the preferred embodiments of the invention with reference to the figures.

DETAILED DESCRIPTION

Figure 1:
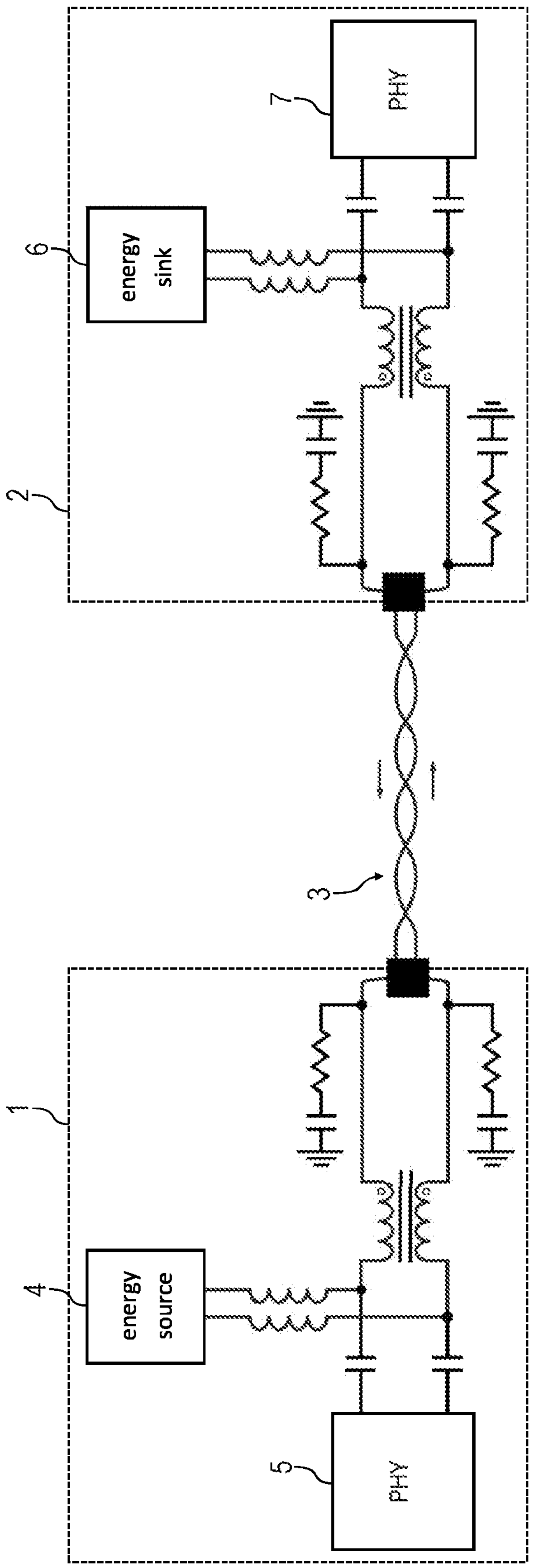
Fig. 1 prior art
FIG. 1 shows a conventional transmission system as described at the beginning.
Figure 2:
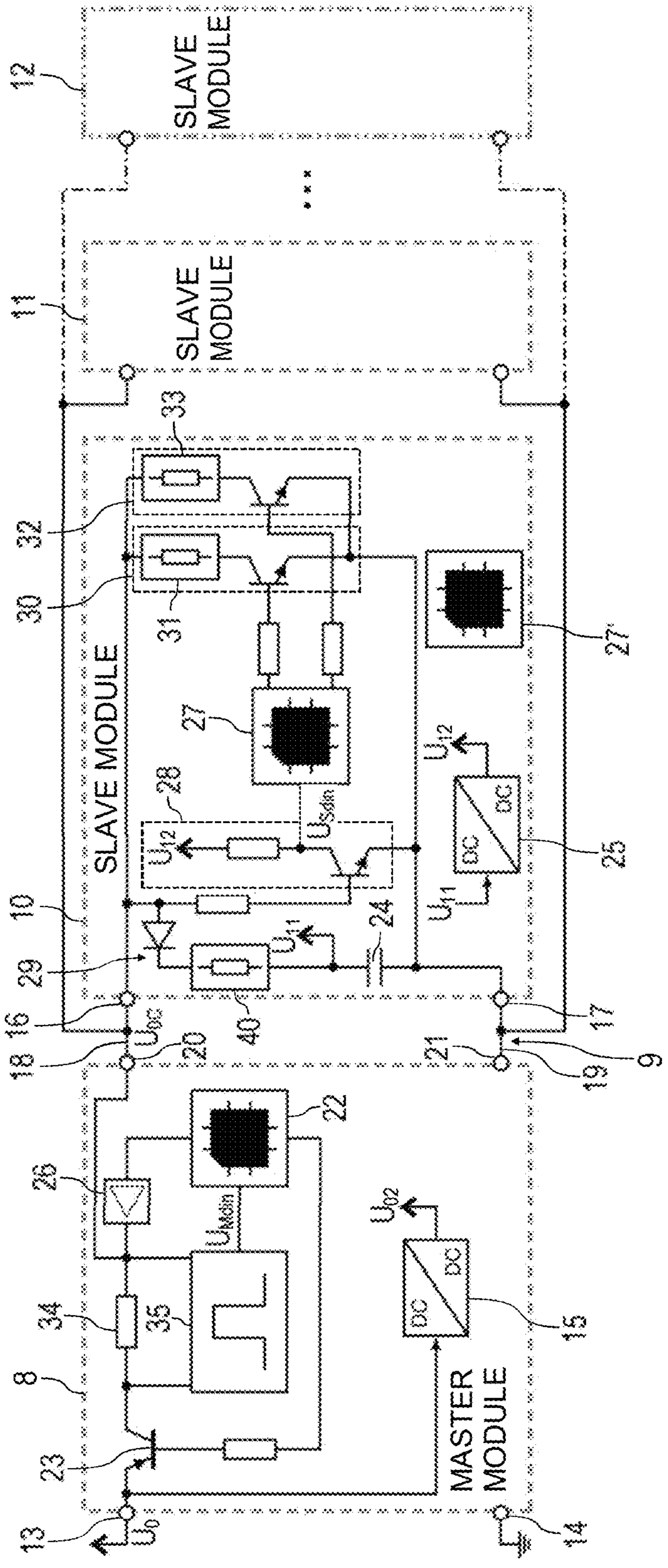
FIG. 2 shows an example of a transmission system according to the invention.

In the following, the embodiment of a transmission system according to the invention illustrated in FIG. 2 is described, which comprises a master-module 8, a two-wire line 9 and several slave modules 10-12, wherein only the slave-module 10 is illustrated in detail, while the other slave-modules 11, 12 are only indicated schematically.

The master-module 8 is supplied with a supply voltage $U_0$ via two input connections 13, 14 ("master input +" and "master input −"). A ground can be connected internally to the input connection 14 ("master input −").

The master module 8 can generate an internal voltage $U_{02}$ via a voltage regulator 15.

The slave modules 10-12 each comprise two input connections 16, 17 ("slave +" and "slave −"), which are each connected to two output connections 20, 21 of the master-module 8 via a supply line 18, 19 of the two-wire line 9. The other slave-modules 11, 12 are connected in parallel.

The core function of the invention is now that both an energy supply from the master-module 8 to the slave-modules 10-12 and a bidirectional digital data transmission between the master-module 8 and the slave-modules 10-12 can take place via the two-wire line 9 consisting of the two supply lines 18, 19, which is solved as follows.

The temporal operation of the transmission system via the two-wire line 9 consisting of the two supply lines 18, 19 can be divided into three phases (operating states):

- Phase A: energy transmission phase, i.e. energy transmission from the master-module 8 to the slave-modules 10-12.
- Phase B: a master-to-slave communication phase (downlink-broadcast-phase), i.e. a data transmission from the master-module 8 to at least one of the slave-modules 10-12.
- Phase C: a slave-to-master communication phase (uplink-phase), i.e. a data transmission from one of the slave-modules 10-12 to the master-module 8.

The master-module 8 contains a microprocessor 22, which can control a switch 23, for example a bipolar transistor, with which the supply voltage $U_0$ or an internally generated voltage (e.g. $U_{02}$) can be forwarded to the output connection 20.

In the phase A and in the phase C, the switch 23 is controlled, i.e. closed. No data transmission takes place in the phase A. The slave-modules 10-12 contain an energy store 24 (e.g. capacitor), which can be charged in the phase A and recharged at the beginning of the phase C. A voltage regulator 25, which is contained in the slave-modules 10-12, can convert the time-varying voltage $U_{11}$ of the energy store 24 into a stabilized voltage $U_{12}$, which is provided to the microprocessor 27 and further electronics 27' contained in the slave-modules 10-12.

In the phase B, the switch 23 in the master module 8 is opened for a certain period of time. The microprocessor 22 can now send voltage pulses to the output connection 20 of the master-module 8 via the controllable switch 23 and/or directly from an output circuit of the microprocessor via an output circuit 26. The voltage $U_{11}$ of the energy store 24 in the slave-modules 10-12 decreases with increasing time, depending on the current consumption of the slave-modules 10-12 and the resulting discharge of the energy store 24 in this phase. The output circuit 26 is provided between the output of the microprocessor 22 and the output connection 20 of the master-module 8 in order to be able to transmit data via this path.

The slave-modules 10-12 contain a microprocessor 27, which is connected to a voltage detector 28. The voltage detector 28 has the task to detect the voltage pulses emitted by the master-module 8 when they exceed or fall below a threshold value and to adjust their level to a value that can be processed by the microprocessor 27. The voltage detector 28 can, for example, consist of a voltage divider or an NPN bipolar transistor with an upstream base resistor and emitter resistor, which is connected to an internal supply voltage $U_{12}$. To prevent rapid discharging of the energy store 24 contained in the slave-module 8 in this phase B, a discharge protection 29, for example in the form of a diode, can be provided.

In phase C, the slave-to-master communication phase, the controllable switch 23 contained in the master-module 8 is closed so that energy can be provided to the slave-modules 10-12 by the master module 8. The energy stores 24 of the slave-modules 10-12, which may have been partially discharged in a previous master-to-slave communication phase, are recharged at the beginning of the phase C.

During or following this recharging phase, the slave-modules 10-12 can change their current consumption via a current pulse generator 30. The current pulse generator 30 can consist of a bipolar transistor with a base resistor, which can be controlled by the microprocessor 27 contained in the slave-modules 10-12. The amplitude of the current flowing from the master-module 8 to the slave-modules 10-12 can be influenced by a current limiter 31 (in the simplest case a collector resistor), which is switched on and off by the transistor of the current pulse generator 30.

In addition, a further current pulse generator 32 can be connected in parallel in order to generate different current pulse levels. The current pulse generator 32 may also comprise a possibly different current limiter 33.

The master-module 8 contains a current detector, e.g. in the form of a current measuring resistor 34 and a pulse detector 35, in order to convert the current pulses generated by the slave-modules 10-12 in the load current into a signal that can be evaluated by the microprocessor 22 contained in the master-module 8. The current detector measures the total current from normal power supply and the current pulses for the communication, which must be separated and processed correspondingly by the pulse detector 35. The method is also known in the literature as load modulation, as the current load is changed by the slave-modules 10-12, which in turn can be detected in the master-module 8.

A suitable anti-collision method can be used so that the master-module 8 can clearly assign the communication of the slave-modules 10-12.

Figure 3:
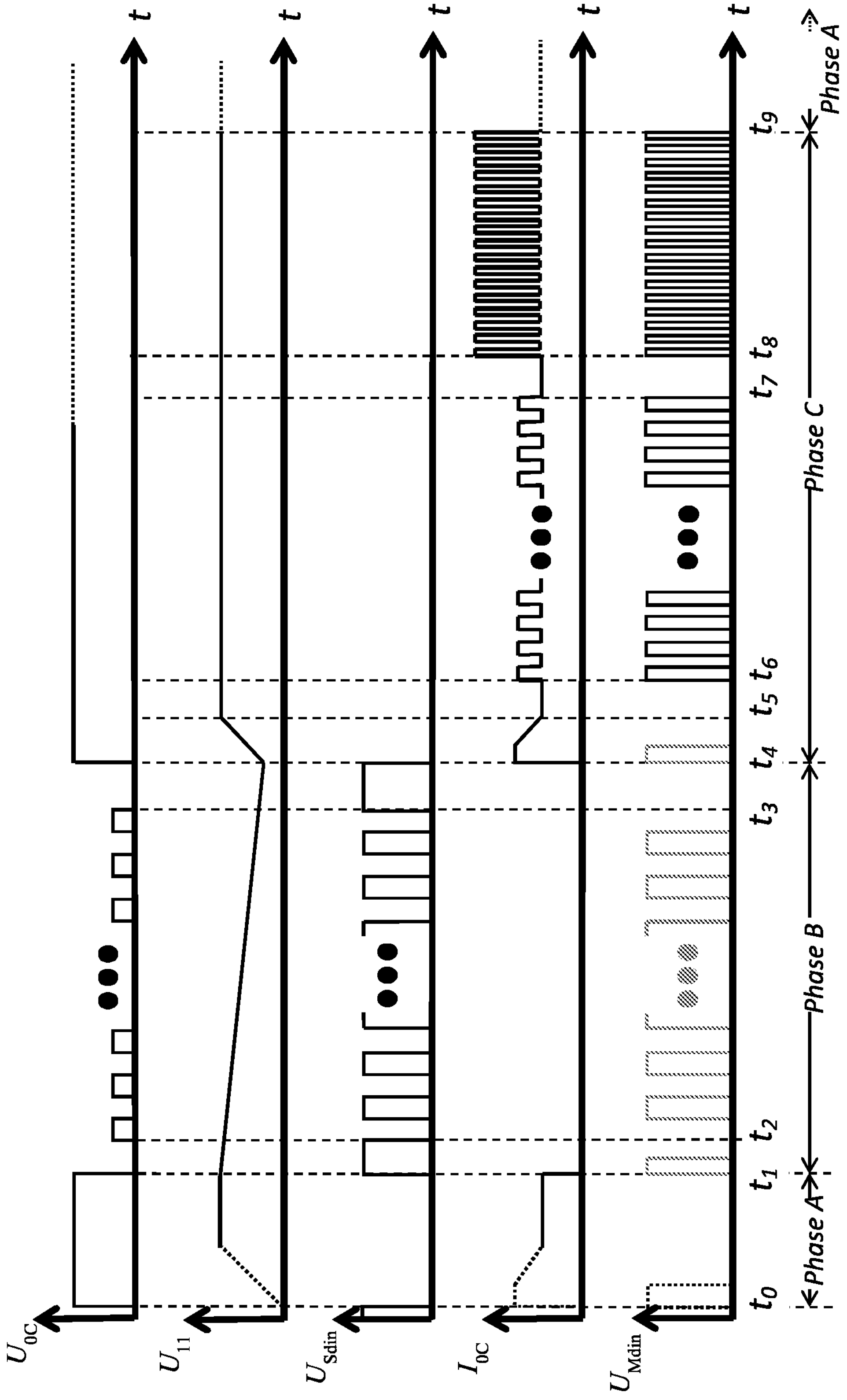
FIG. 3 shows the chronological sequence of voltages and currents in the embodiment according to FIG. 2.

FIG. 3 shows an example of the schematic time curve of different voltages and currents that can occur at different positions of the transmission system for energy and data transmission via the two-wire line 9 consisting of the supply lines 18, 19. All time curves are based on the same time base.

An energy transmission phase (phase A) takes place between $t_0$ and $t_1$, a master-to-slave communication phase (phase B) takes place between $t_1$ and $t_4$, and a slave-to-master communication phase (phase C) takes place between $t_4$ and $t_9$. This is followed by a new energy transmission phase (phase A) from time $t_9$.

The signal $U_{0C}$ represents the chronological sequence of the voltage between the input connections 16, 17 of the slave-module 10 (slave+ and slave−) and corresponds to the input voltage $U_0$ between the times $t_0$ and $t_1$ minus a possible voltage drop across the controllable switch 23 in the master-module 8 as well as a voltage drop across the supply lines 18, 19 and the wiring. Alternatively, the applied voltage can also be set to a different value via an internal voltage regulator.

At the time $t_1$, the controllable switch 23 in the master-module 8 is opened and the voltage drops to a low value, e.g. 0V.

Between the times $t_2$ to $t_3$, voltage pulses are generated, which can either be generated directly by the microprocessor 22 of the master-module 8 by means of the output circuit 26 or generated with the aid of the controllable switch 23. As no (or no large) capacitance is connected directly to the signal path during this period, the steep edges of the voltage pulses are maintained. The voltage level of the voltage pulses between $t_2$ and $t_3$ can optionally comprise a different value than in the period between $t_0$ and $t_1$. The voltage pulses can contain information that is transmitted from the master-module 8 to all connected slave-modules 10-12. An example of such information can be a request command packet for a data packet of one of the slave-modules 10-12. A data packet can consist of various parts, such as a destination address, the data to be transmitted and a CRC-error detection part (CRC: Cyclic Redundancy Check).

At time $t_4$, the controllable switch 23 is closed again so that the level corresponds to the value in the period between $t_0$ and $t_1$.

Another option is that the voltage $U_{0C}$ between $t_1$ and $t_4$ is not completely reduced to 0V in the meantime, but only slightly reduced, e.g. from 10V to 5V or from 24V to 22V. This can have the advantage that a continuous energy transmission is made possible and the time span between $t_2$ and $t_3$ in which a data transmission is possible can be extended.

The voltage $U_{11}$ at the energy store 24 of the slave-module 10 initially increases depending on the state of charge of the energy store 24 from the time $t_0$ until it finally assumes a more or less constant value. As the controllable switch 23 is opened at time $t_1$, the voltage of the energy store 24 decreases depending on the current consumption of the slave-module 10.

At time $t_4$, the controllable switch 23 in the master-module 8 is closed and the energy store 24 is recharged. With a constant charging current, which can be realized, for example, by a current limiter circuit 40 connected upstream of the energy store 24, the voltage at the energy store 24 increases linearly. The current limiter circuit 40 offers the advantage that the charging current is limited at the time $t_4$, which limits the load on the controllable switch 23 of the master-module 8, through which the total current of all connected slave-modules 10-12 flows. The voltage at the energy store 24 reaches a maximum value at time $t_5$ and remains more or less constant from this time onwards.

The voltage curve marked with the signal $U_{Sdin}$ corresponds to the voltage pulse detector signal provided to the microprocessor 27 in the slave module 8. The signal can be, for example, an inverted and level-adjusted version of the voltage signal $U_{0C}$ due to an optional inverter and level limiter circuit in the voltage detector 28.

Level changes on this signal typically run synchronously with level changes in the voltage $U_{0C}$. The threshold value for the level change must be selected low enough so that the changes can also be correctly detected during phases of smaller amplitudes of the voltage $U_{0C}$. This signal can be fed to the microprocessor 27 and evaluated there so that the information sent can be recognized by the master-module 8 and responded to accordingly.

The time curve of the current flowing through the current detector or through the current measuring resistor 34, respectively, is marked with the signal $I_{0C}$. At the time $t_0$, the current is typically high depending on the charge state of the energy store 24 of the connected slave-modules 10-12. The current is limited by the optional charging current limitation. If the voltages of the energy stores 24 of the connected slave-modules 10-12 reach a certain level, the current falls below the limiting current and the current decreases over time until it reaches a constant value and all energy stores are charged. The more or less constant value that then typically occurs is given by the current requirement of the connected slave-modules 10-12, which is assumed to be constant in this example for a clearer illustration.

Between the times $t_1$ and $t_4$, the controllable switch 23 is open and the required operating current of the slave-modules 10-12 is provided from the respective energy stores 24, so that no current flows through the current measuring resistor 34.

At time $t_4$, the controllable switch 23 is closed and the energy stores 24 contained in the connected slave-modules 10-12 are recharged. The charging current can be limited as described above and decreases when a certain voltage level of the energy store 24 is reached.

At time $t_5$, the energy stores 24 are fully charged and a more or less constant current flows through the current measuring resistor 34, which is given by the operating current of the slave-modules 10-12, which is assumed to be constant.

Between the times $t_6$ to $t_7$, current pulses are generated by the current pulse generator 30 of one of the slave-modules 10-12. The current pulses briefly and steeply increase the current in the current measuring resistor 34 compared to a basic value, which is given by the more or less constant operating current of the slave modules 10-12. The level of the current value during the active current pulses can be set by the current limiter 31. A good compromise between a sufficient signal level on the one hand and a minimization of the power loss on the other is generally selected here.

By suitably buffering the supply voltage of the slave-modules 10-12 and the current limiter 40, the temporal change of the operating current of the slave-modules 10-12 can only take place slowly, while the current pulses can cause a temporally rapid change of the current in the current measuring resistor 34. This means that the current pulses can also be transmitted during the recharging of the buffer-capacity, as the rapid current change associated with the pulses can be easily separated from the weak or slow current changes or the constant current each caused by the recharging of the energy store 24. An abrupt current change after switching the power supply on or off up to the level of the current limitation is limited to a defined period and must be ignored by the master-module 8. The current pulses can contain binary information that can be transmitted from the microprocessor 27 in the slave-module 10 to the master-module 8. An example may be a response to a request command from the master-module 8. An advantage of the invention is that an energy transmission from the master-module 8 to the slave-modules 10-12 during phase C is possible. In this respect, information can be transmitted from the slave-modules 10-12 to the master-module 8 over a longer period of time. This is particularly advantageous if a lot of information has to be transmitted from the slave-modules 10-12 to the master-module 8 and only relatively little information is to be transmitted from the master-module 8 to the slave-modules 10-12.

No current pulses are generated in the period between the times $t_7$ and $t_8$. Between the time $t_8$ and $t_9$, current pulses with a higher amplitude and shorter interval width are generated than in the period $t_6$ to $t_7$, which can be generated by the second current pulse generator 32. Due to the higher amplitude of the current, which in an exemplary embodiment is higher (the current limiter 33 is selected differently than the current limiter 31) than the current consumption at the beginning of the recharging of the energy store 24 at time $t_0$ and $t_4$, other information, e.g. time-critical information such as an error indicator, can be transmitted in a more interference-proof manner than is the case when transmitting the data in the time interval between $t_6$ to $t_7$. By using an interval width that differs from that in the time interval $t_6$ to $t_7$, the error information can also be detected quickly and efficiently without, for example, reconstructing data packets or performing an error detection. For example, only one or a few pulses can be transmitted here, signalling the need for immediate action.

The voltage curve generated by the pulse detector 35 and provided to the microprocessor 22 in the master-module 8 is described in FIG. 2 as $U_{Mdin}$. The voltage curve comprises binary levels, a high level that ideally corresponds to the supply voltage of the microprocessor 22 in the master-module 8 and a low level that ideally corresponds to 0V.

Between the times $t_0$ and $t_1$, the voltage level depends on the state of charge of the energy store 24 and thus the current change of the current in the measuring resistor $dI_{0C}/dt$. The exact procedure is described in FIGS. 3 and 4. In the example shown, the current change at the time $t_0$ is strongly positive and leads to a high level of the pulse detector 35, is then constant and then becomes negative, which leads to a low level of the pulse detector 35.

At time $t_4$ the current change is high, is then constant and then negative, which also leads to a signal with a changing level. Both level changes of $U_{Mdin}$ are not relevant for data or information transmission, respectively, and can or must be ignored by the microprocessor.

In the period $t_6$ to $t_7$, the current change caused by the current pulse generators 30, 32 of the slave-modules 10-12 is converted into corresponding signal levels. In the period between the times $t_8$ and $t_9$, the current pulses generated by the second current pulse generators of the slave-modules 10-12 are converted into signal levels with a different edge width. The different current pulse amplitude is not differentiated in this embodiment. For the communication from the slave-module 8 to the master-module 8, only the time periods $t_6$ to $t_7$ and $t_8$ to $t_9$ contain information. Level changes of the voltage $U_{Mdin}$ in other time periods do not contain any information relevant for the communication between the master-module 8 and slave-modules 10-12. The time at which the controllable switch 23 is closed and opened is known to the microprocessor 22 in the master-module 8. The closing and opening of the controllable switch 23 each time results in a high current change $dI_{0C}/dt$, caused by the recharging of the energy stores 24 in the slave-modules 10-12, which is noticeable in level changes on the voltage $U_{Mdin}$. The duration of the resulting level is to be estimated by the master-module 8 and the slave-modules 10-12 and must not be taken into account for the communication.

Figure 4:
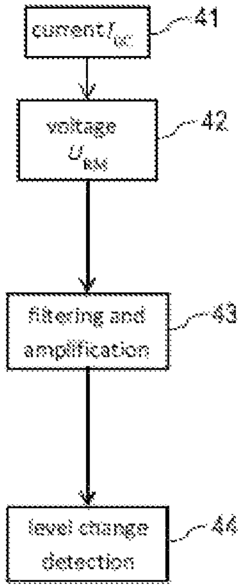
FIG. 4 shows a schematic illustration of a current pulse detector in the master-module.
Figure 5:
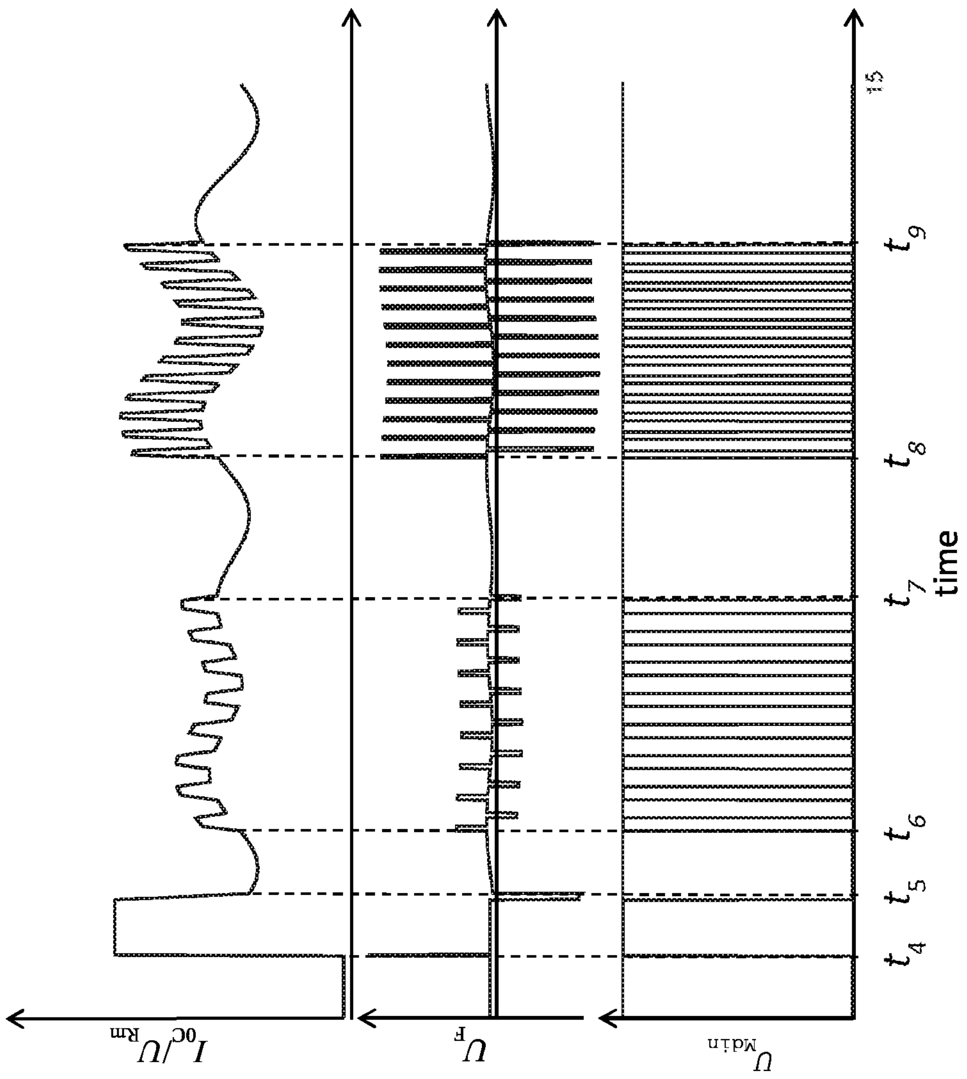
FIG. 5 shows the signal curves indicated for the current pulse detector according to FIG. 4.

FIG. 4 contains a schematic illustration of a pulse detector 35 and FIG. 5 shows the signal characteristics.

The current $I_{0C}$ (block 41) corresponds to the current that flows through the current measuring resistor 34 in the master-module 8.

The voltage $U_{Rm}$ (block 42), which drops differentially across the current measuring resistor 34, is directly proportional to the current.

By a high-pass or band-pass filtering and amplification of the voltage $U_{Rm}$ (block 43), the slowly varying part of the voltage change, which can be caused by the time-varying current consumption of the slave-modules 10-12, is attenuated more strongly than temporally rapid changes. A temporally rapid increase in the current through the current measuring resistor 34, as can be caused by switching on a suitable current pulse generator in a slave-module 10 connected to the master-module 8, leads to a positive voltage pulse of the voltage $U_F$.

If the voltage $U_F$ exceeds a positive threshold value (block 44), a voltage $U_D$ can be assigned a high level. A rapid reduction in the current flowing through the current measuring resistor 34, which can be achieved by switching off a current pulse generator 30, 32 in a slave-module 10 connected to the master-module 8, results in a negative voltage pulse of the voltage $U_F$. If the voltage $U_F$ falls below a negative threshold value, a voltage $U_D$ can be assigned a low level. Since in one realization of the circuit the current pulse generators 30, 32 can generate a current change at a finite speed, the time curve of the current consumption of the slave-modules 10-12 is not constant and the filtering only comprises a limited attenuation, only a finite voltage swing of the voltage $U_F$ can be generated. If the voltage swing is not sufficient so that the voltage $U_F$ reaches a threshold value even at times when one of the current pulse generators 30, 32 is not switched on or off, it can be advantageous to perform an edge detection of the time curve of the voltage $U_F$. For this purpose, for example, the current value of the voltage $U_F$ can be compared with a past value and an edge can be detected when a threshold value of the difference between the two voltages is exceeded.

The time marked with $t_4$ in FIG. 5 corresponds to the time at which the controllable switch 23 in the master-module 8 is closed. The current increases sharply at time $t_4$, as the energy stores 24 contained in the slave-modules 10-12 connected to the master-module 8 are recharged. The current limiter 40 contained in the slave-modules 10-12 can limit the current to a maximum value that depends on the number of connected slave-modules 10-12. The rapid increase in current at the time $t_4$ leads to a voltage pulse of the voltage $U_F$. The voltage $U_{Mdin}$ assumes a high level. At time $t_5$ the charging process is complete and the current decreases rapidly over time. This can be taken as a negative voltage pulse of the voltage $U_F$ and leads to a low voltage level of the voltage $U_{Mdin}$.

Between the times $t_6$ and $t_7$, current pulses are generated by one of the current pulse generators 30, 32 in one of the connected slave-modules 10, 12. Between the times $t_8$ and $t_9$, voltage pulses are generated by the second current pulse generator 32 contained in a connected slave-module 10-12. The current pulses can differ in amplitude and/or frequency.

Figure 6:
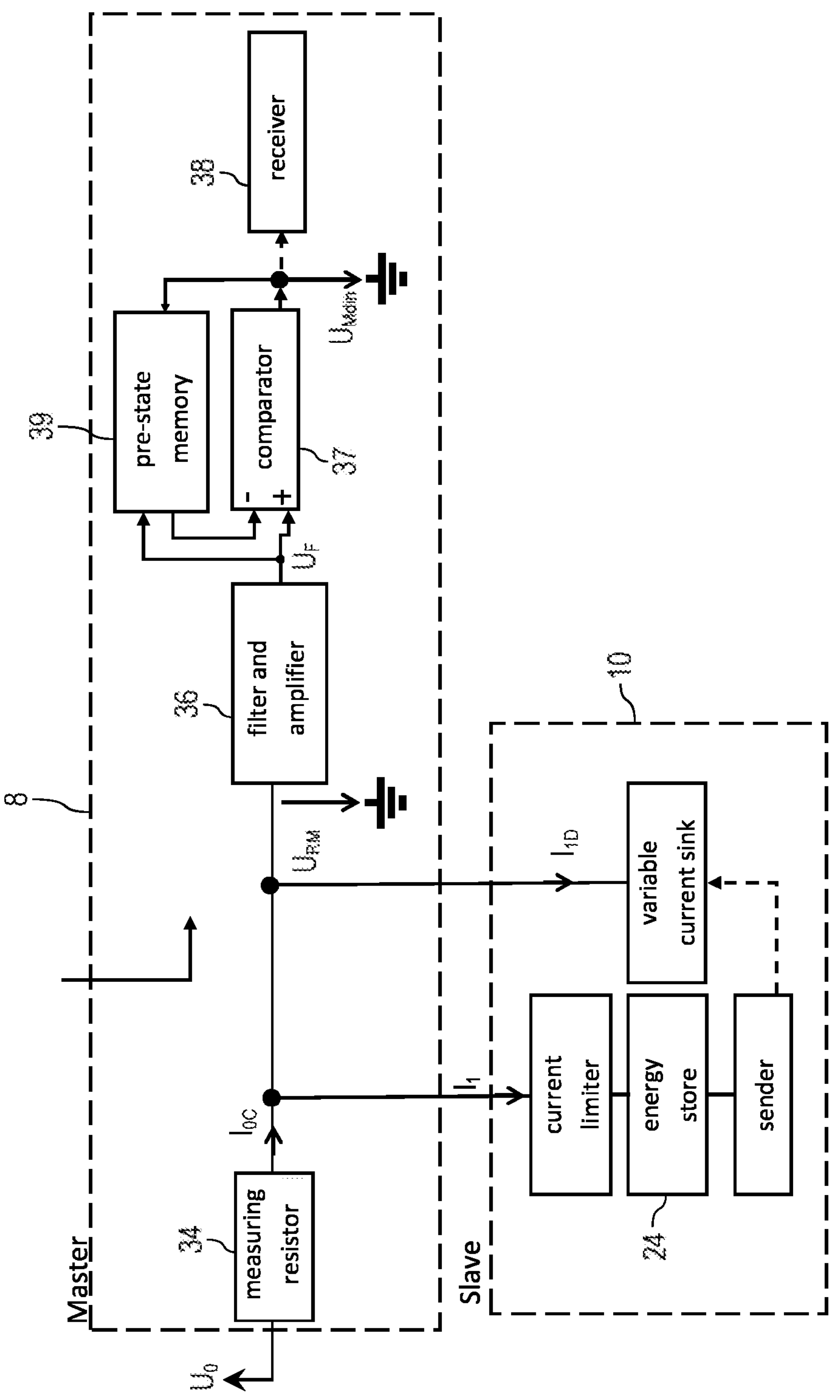
FIG. 6 shows a schematic illustration of the transmission system according to the invention.

FIG. 6 describes a possible implementation of the communication from the slave-modules 10-12 to the master-module 8. In particular, the focus here is on the structure of the pulse detector 35, which is shown here in more detail as a block diagram. In addition, the components from the slave module 8 required for communication via load modulation are illustrated again.

A current $I_{1D}$ that changes abruptly due to the variable current sink is measured together with the supply current $I_1$ flowing continuously to the slave-module 8 as a total current $I_{0C}$ via the current measuring resistor 34 in the master-module 8 and converted into a voltage $U_{Rm}$. Using suitable filter and amplifier elements 36, the rapidly changing current changes can be filtered out from the slow ones. This produces the voltage signal $U_F$. The filtered pulses are then converted via a comparator 37 into a form that can be processed by a receiver 38, producing the signal $U_{Mdin}$. An optional pre-state memory 39 can help to extract more reliable levels from the filtered signal $U_F$.

Figure 7:
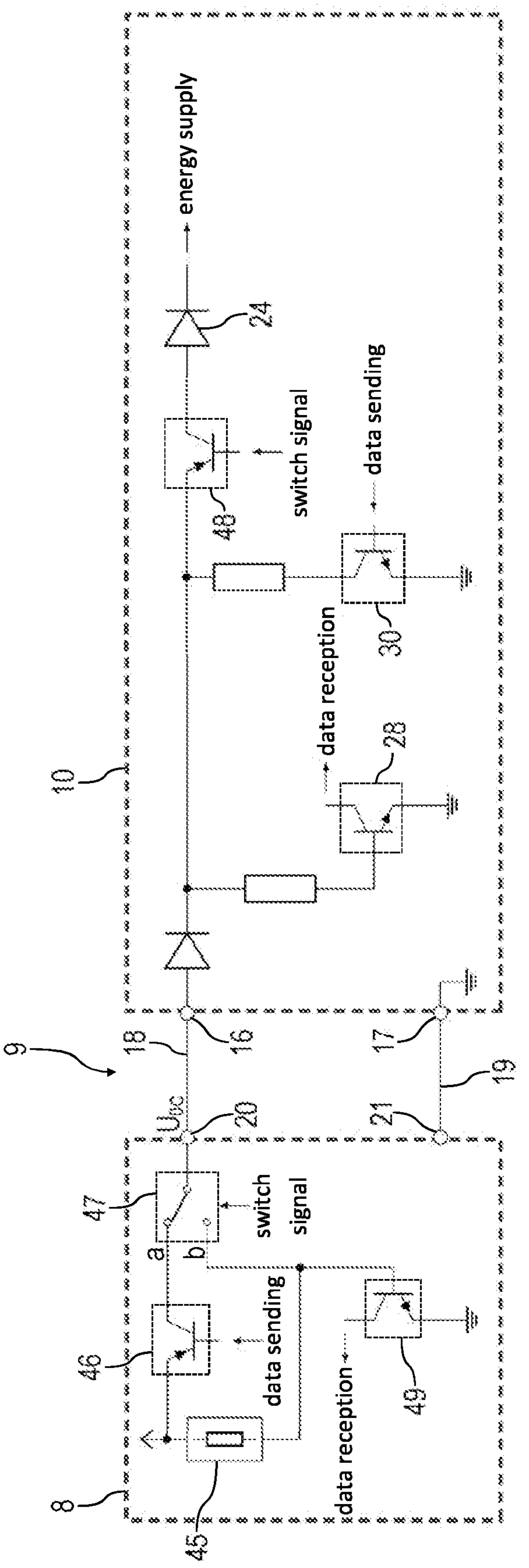
FIG. 7 shows a modified embodiment.

FIG. 7 shows the basic structure of the data transmission path according to a further embodiment. This embodiment corresponds in part to the embodiment as described above, so that reference is also made to the above description in order to avoid repetition, with the same reference signs being used for corresponding details.

The data transmission path consists of a master-module 8, which is connected to a slave-module 10 via a two-wire line 9 (supply line). The master-module 8 can supply the slave-module 10 with power via the two-wire line 9 and communicate with it.

In the supply phase, a changeover switch 47 is in position (a) and a switch 46 is closed.

During a data sending from the master-module 8 to the slave-module 10, the changeover switch 47 remains in position (a) and the switch 46 is switched on and off in time with the data. This results in a potential change on the two-wire line 9, which also sets in time with the data and can be evaluated with the voltage detector 28 in the slave-module 10.

When the master module 8 expects a response, the changeover switch 47 is set to position (b) so that a current limiter 45 limits the current drawn by the slave-module 10. Through the current pulse generator 30, the slave-module 10 can generate a potential change on the two-wire line 9 if the additional current drawn by the current pulse generator 30 is above the limiting current through the current limiter 45. In other words, when the current pulse generator 30 is switched on, more current is required by the master-module 8 than can be provided by the current limiter 45. This results in a voltage drop or potential change on the two-wire line 9, respectively. A voltage detector 49 in the master-module 8 can be used to evaluate this change in potential in the master-module 8. By cyclically switching the current pulse generator 30, data can thus be sent from the slave-module 10 to the master module 8.

During a data sending from the slave-module 10 to the master-module 8, the slave-module 10 can disconnect the two-wire line 9 internally with a switch 48 in order to prevent unwanted influences from the downstream circuit components (e.g. power supply) from affecting the communication. The slave-module 10 must be able to bridge this phase using an energy store, for example, in order to guarantee its own energy requirements.

Figure 8:
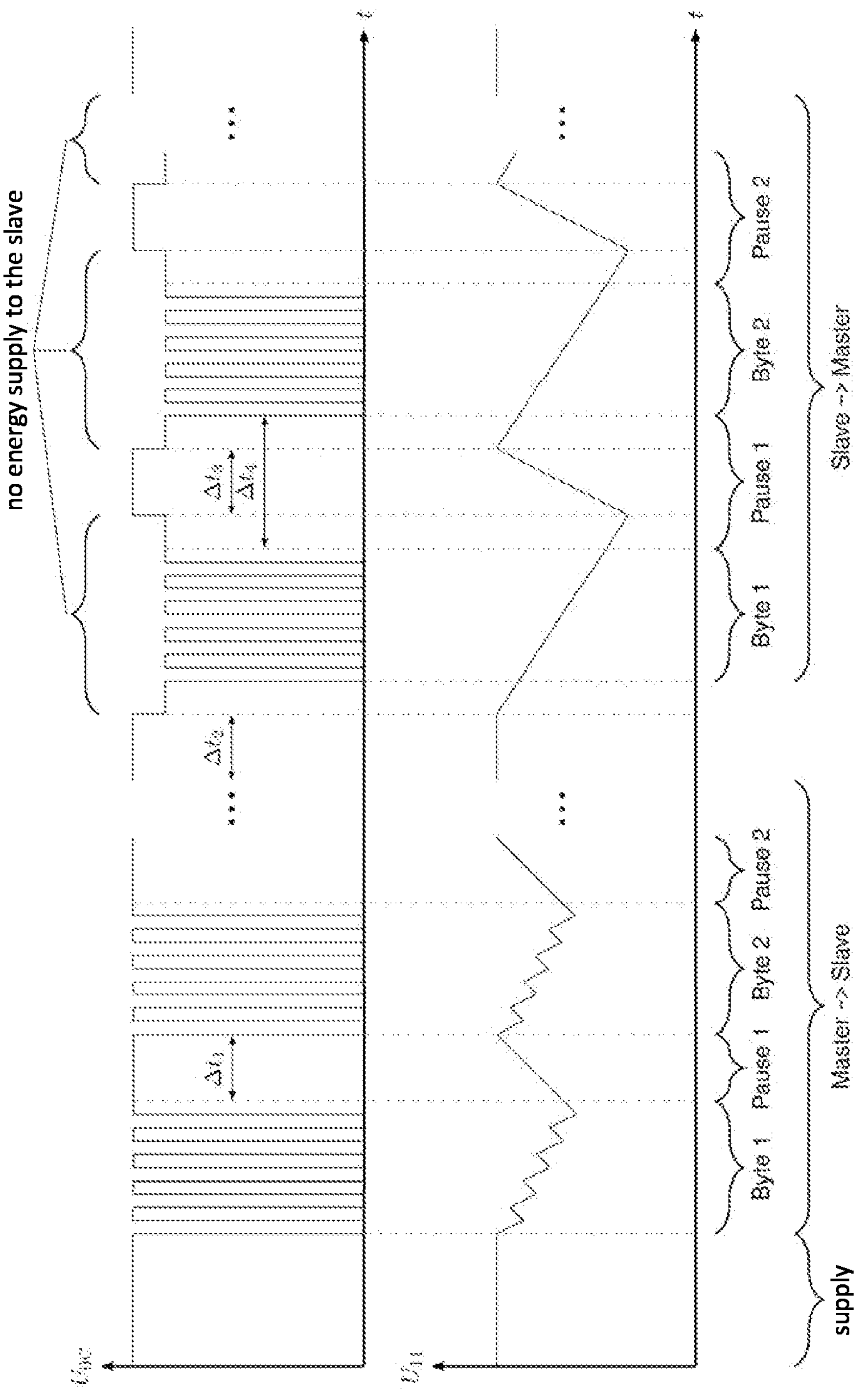
FIG. 8 shows a time diagram with the voltage curves in the embodiment according to FIG. 7.

FIG. 8 describes the voltage signals at the potentials $U_{0C}$ (signal between the master-module 8 and the slave-module 10 on the two-wire line 9) and $U_{11}$ (voltage at the energy store of a slave) during a communication sequence between the two devices. A modified method to the previously described sequence is used:

In phase 1 ("supply"), the slave-module 10 is supplied with energy by the master-module 8 via the potential $U_{0C}$, which is also stored in the energy store with the potential $U_{11}$.

Phase 2 ("master→slave") follows, in which the master-module 8 sends data to the slave-module 10 via $U_{0C}$. The special feature here is that during the transmission of a defined amount of data, the voltage at the energy store has dropped significantly, so that the entire data content cannot be transmitted without the slave-module 10 would switch off in the meantime, as the supply voltage would no longer be sufficient to operate the device at some point. This is remedied by transmission pauses between two of the above-mentioned defined quantities of transmitted data, during which a short supply phase of length $\Delta t_1$ is inserted in which the energy store can recharge again. This would theoretically allow a transmission of any amount of data from the master-module 8 to the slave-module 10.

As already described in FIG. 7, the return communication from the slave-module 10 to the master-module 8 takes place differently as described in the previous explanations. If the master-module 8 expects data from the slave-module 10 after the time period $\Delta t_2$, it switches on a current limitation for the potential $U_{0C}$ (changeover switch 47). This means that the slave-module 10 can no longer draw any amount of current without the voltage $U_{0C}$ collapsing. This principle is used for the data transmission from the slave-module 10 to the master-module 8 by the slave-module 10 switching a load on and off in time with the data to be transmitted, which is dimensioned in such a way that the voltage $U_{0C}$ drops sufficiently when the load is switched on. The master-module 8 can then read in the modulated voltage (via the voltage detector 49) and evaluate it correspondingly.

While the current limitation in the master-module 8 is active (changeover switch 47 in position (b)), no additional energy is provided for the operation of the slave-module 10 (switch 48 for disconnecting the supply from FIG. 7 is open). Correspondingly, the voltage $U_{11}$ at the energy store of the slave-module 10 drops continuously in this phase. Here, after a defined amount of transmitted data, there is a correspondingly timed transmission pause of length $\Delta t_4$, during which the master-module 8 switches the supply back on for $\Delta t_3$, i.e. switches the changeover switch 51 to state (a). The energy store can be recharged during this phase. The master-module 8 then switches the current limitation back on and awaits the next data packet from slave-module 10. Here, any amount of data can theoretically be transmitted from the slave-module 10 to the master-module 8.

Figure 9:
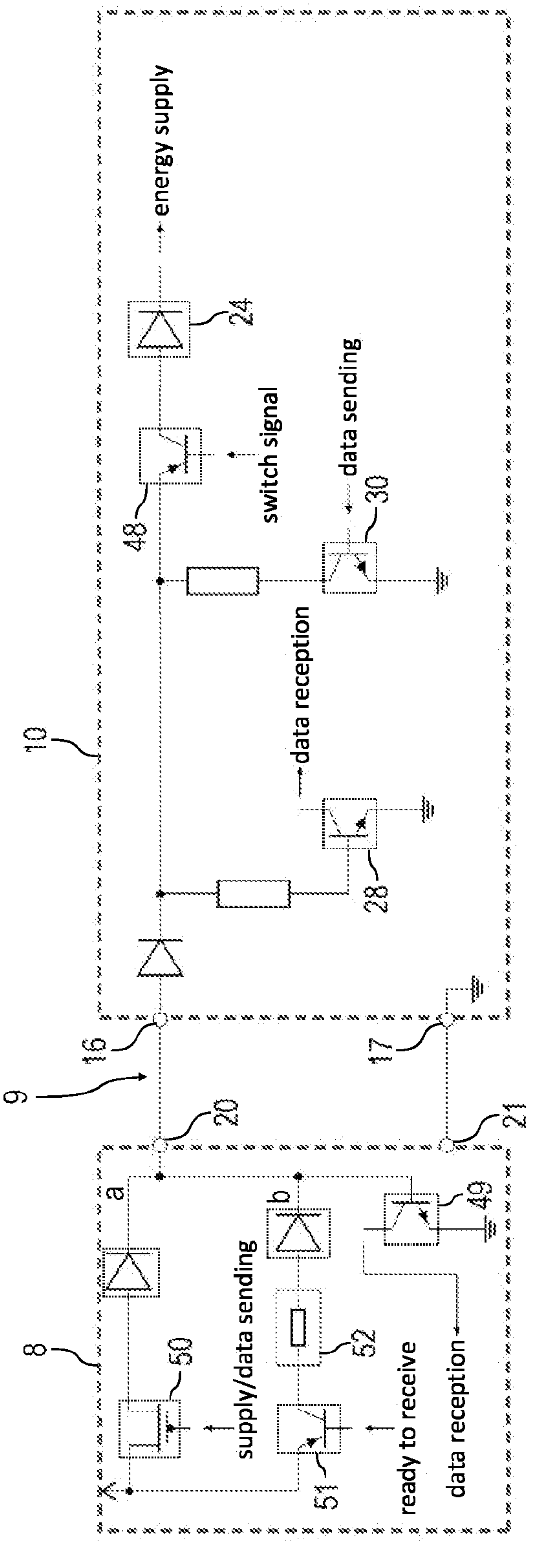
FIG. 9 shows a further modified embodiment.

The embodiment according to FIG. 9 corresponds in part to the embodiment according to FIG. 7, so that to avoid repetition, reference is also made to the above description, wherein the same reference symbols are used for corresponding details.

FIG. 9 shows the basic structure of the data transmission path. It consists of a master-module 8, which is connected to a slave-module 10 via a two-wire line 9 (supply line). The master-module 8 can supply the slave-module 10 with power via the two-wire line 9 and communicate with it.

In the supply phase, a switch 50 is closed and preferably a switch 51 is open, so that path (a) is in use.

During a data transmission from the master-module 8 to the slave-module 10, the switch 50 is switched on and off in time with the data. This results in a potential change on the two-wire line 9, which also sets in time with the data and can be evaluated by the voltage detector 28 in the slave-module 10. While the switch 50 is switched off, the slave-module 10 must power itself, e.g. via an energy store.

When the master-module 8 expects a response, the switch 50 is opened and the switch 51 is closed. Path (b) is therefore in use, so that the current drawn by the slave-module 10 is limited by a current limiter 52. The current pulse generator 30 enables the slave-module 10 to generate a potential change on the two-wire line 9 if the additional current drawn by the current pulse generator 30 is higher than the limiting current due to the current limitation 52.

A voltage detector 49 in the master-module 8 can be used to evaluate this change in potential in the master-module 8.

During a data sending from the slave-module 10 to the master-module 8, the slave-module 10 can disconnect the two-wire line 9 internally with the switch 48 so that the communication is not affected by unwanted influences from the downstream circuit components (e.g. power supply). The slave-module 10 must be able to bridge this phase using an energy store, for example, in order to guarantee its own energy requirements.

The invention is not limited to the preferred embodiments described above. Rather, a large number of variants and modifications are possible which also make use of the inventive concept and therefore fall within the scope of protection. In particular, the invention also claims protection for the subject matter and the features of the sub claims independently of the claims referred to in each case and, in particular, also without the features of the main claim. The invention thus comprises different aspects of the invention, which enjoy protection independently of each other.

LIST OF REFERENCE SYMBOLS

1 master-module
2 slave-module
3 two-wire line
4 energy source of the master-module
5 data interface of the master-module
6 energy sink of the slave-module
7 data interface of the slave-module
8 master-module
9 two-wire line
10-12 slave-modules
13 input connection of the master-module on high-side
14 input connection of the master-module on low-side
15 voltage regulator in the master-module
16 input connection of the slave-module to high-side
17 input connection of the slave-module to low-side
18, 19 supply lines between master-module and slave-module
20 output connection of the master-module on high-side
21 output connection of the master-module on low-side
22 microprocessor in the master-module
23 switch in the master-module
24 energy store in the slave-module
25 voltage regulator in the slave-module
26 output circuit in the master-module
27 microprocessor in the slave-module
27' further electronics in the slave-module
28 voltage detector in the slave-module
29 discharge protection in the slave-module
30 current pulse generator 1 in the slave-module
31 current limiter of the current pulse generator 1 in the slave-module
32 current pulse generator 2 in the slave-module
33 current limiter of the current pulse generator 2 in the slave-module
34 current measuring resistor in the master-module
35 pulse detector in the master-module
36 filter and amplifier elements in the master-module
37 comparator
38 receiver
39 pre-state memory
40 current limiter circuit in the slave-module
41 block "provision of current $I_{0C}$"
42 block "supply of voltage $U_{RM}$"
43 block "filtering and amplification"
44 block "level change detection"
45 current limitation
46 switch
47 changeover switch
48 switch
49 voltage detector
50 switch
51 switch
52 current limitation
$U_0$ supply voltage of the master-module
$U_{02}$ internal voltage in the master-module $U_{11}$ voltage of the energy store (capacitor) in the slave-module $U_{12}$ internal supply voltage in the slave-module $U_{Sdin}$ voltage at the data input of the microprocessor in the slave-module $U_{0C}$ voltage at the input connection of the slave-module on the high side $U_{Mdin}$ voltage at the data input of the microprocessor in the master-module $I_{0C}$ current through the current measuring resistor in the master-module $I_1$ supply current to the slave-modules $U_{Rm}$ voltage across the current measuring resistor in the master-module $U_F$ voltage pulse at the input of the comparator

What is claimed is:

1. A transmission system for transmission of data and energy, with
   a) a master-module,
   b) at least one slave-module, and
   c) a two-wire line between the master-module and the slave-module for bidirectional data transmission between the master-module and the slave-module and for energy transmission from the master-module to the slave-module, wherein
   d) the transmission system is switchable between several operating states, said operating states comprising:
      1) a first operating state for energy transmission from the master-module to the at least one slave-module via the two-wire line,
      2) a second operating state for data transmission from the master-module to the at least one slave-module via the two-wire line,
      3) a third operating state for data transmission from the at least one slave-module to the master-module via the two-wire line; and wherein said transmission system is switchable between at least two of said first, second and third operating states; and
   e) wherein the energy transmission from the master-module to the at least one slave-module is temporarily restricted or interrupted in the second operating state during the data transmission from the master-module to the at least one slave-module;
   f) wherein the at least one slave-module comprises an energy store in order to supply the slave-module with the energy required for operation during the restriction or interruption of the energy transmission from the master-module in the second operating state, and
   g) wherein the at least one slave-module comprises a discharge protection in order to prevent excessive discharge of the energy store during the restriction or interruption of the energy transmission from the master-module in the second operating state; and wherein at least one of:
   a) the master-module comprises a controllable changeover switch which connects the two-wire line in the master-module either to a supply voltage or to a receiver,
   b) the master-module comprises a controllable switch between the supply voltage and the changeover switch in order to transmit voltage pulses via the two-wire line,
   c) the slave module contains a voltage detector to detect the voltage pulses sent by the master-module via the two-wire line, and
   d) the slave-module comprises a current pulse generator to generate current pulses for the data transmission from the slave-module to the master-module.

2. The transmission system according to claim 1, wherein at least one of: in the first operating state no data transmission takes place from the master-module to the at least one slave-module, in the second operating state no energy transmission takes place from the master-module to the at least one slave-module, and in the third operating state also an energy transmission takes place from the master-module to the at least one slave-module.

3. The transmission system according to claim 1, wherein the master-module and the at least one slave-module are configured to transmit data from the at least one slave-module to the master-module by load modulation via the two-wire line.

4. The transmission system according to claim 3, wherein
   a) the at least one slave-module comprises a current modulator in order to modulate a load current provided by the master-module via the two-wire line corresponding to the data to be transmitted, and
   b) the master module comprises a current demodulator in order to demodulate the load current provided by the slave-module and to determine the data contained therein.

5. The transmission system according to claim 4, wherein the current modulator in the at least one slave-module comprises at least one current pulse generator which modulates the load current provided via the two-wire line in the form of pulses, so that the load current comprises current pulses corresponding to the data to be transmitted.

6. The transmission system according to claim 5, wherein
   a) the current modulator in the at least one slave-module comprises several current pulse generators which are connected in parallel, and
   b) the current pulse generators connected in parallel modulate the load current provided via the two-wire line differently, so that the load current is configured to show different current pulses.

7. The transmission system according to claim 5, wherein the current pulse generator in the at least one slave-module comprises at least one of the following components:
   a) a switching element, the switching element being connected between the two lines of the two-wire line in order to modulate the load current which is provided by the master-module via the two-wire line,
   b) a current limiter in order to limit the load current when a transistor switches through, and
   c) a microprocessor for controlling the transistor according to the data to be transmitted from the slave-module to the master-module.

8. The transmission system according to claim 4, wherein the current demodulator in the master-module comprises a current pulse detector in order to detect current pulses of the load current.

9. The transmission system according to claim 8, wherein the current pulse detector in the master-module comprises at least one of the following components:
   a) a filter in order to pass through rapidly varying current changes of the load current caused by information-containing current pulses, and to attenuate slowly varying current changes of the load current, the filter outputting a load current signal,
   b) an amplifier for amplifying the load current signal filtered by the filter,
   c) a detector for comparing the load current signal with at least one predetermined level, and d) a pre-state memory for temporarily storing a pre-state of the load current signal, wherein the detector compares a current state of the load current signal with the pre-state of the load current signal stored in the pre-state memory.

10. The transmission system according to claim 1, wherein the master-module comprises at least one of the following components for the data transmission to the at least one slave-module:

a) the controllable switch for switching the energy transmission from the master-module to the at least one slave-module during the data transmission from the master-module to the at least one slave-module, b) an output circuit for generating voltage pulses on the two-wire line corresponding to data to be transmitted to the at least one slave-module, and c) a microprocessor for providing data to be transmitted to the slave module and for controlling the controllable switch or the output circuit corresponding to the data to be transmitted to the at least one slave-module.

11. The transmission system according to claim 1, wherein a) the master-module and the at least one slave-module have a common electrical reference potential, or b) the transmission system is configured as a bus system, so that several slave-modules connected in parallel are connectable to the master-module via the two-wire line.

12. The transmission system according to claim 1, wherein the transmission system is switchable between at least two of the following operating states:

a) the first operating state for energy transmission from the master-module to the slave-module, wherein the changeover switch in the master-module connects the two-wire line to the supply voltage and the changeover switch is closed so that the supply voltage is connected to the two-wire line and supplies the slave-module with current via the two-wire line, b) the second operating state for data transmission from the master-module to the slave-module, wherein the changeover switch in the master-module connects the two-wire line to the supply voltage and the changeover switch modulates the supply voltage corresponding to the data to be transmitted, and c) the third operating state for data transmission from the slave-module to the master-module, wherein the changeover switch in the master-module connects the two-wire line to the receiver and the receiver in the master-module receives the data sent by the slave-module via the two-wire line.

13. The transmission system according to claim 1, wherein a) the receiver in the master-module comprises a transistor, which is connected with its base to the two-wire line via the changeover switch, b) the transistor of the receiver in the master-module is connected between the supply voltage and ground, and c) a current limiter is arranged in the master-module between the supply voltage and the transistor.

14. A master-module for a transmission system according to claim 1, wherein the master-module is switchable between several operating states, the operating states differing with regard to at least one of the following:

the energy transmission; and the data transmission.

15. The master-module according to claim 14, wherein the master-module is switchable between at least two of the following operating states:

a) the first operating state;

b) the second operating state; and c) the third operating state.

16. The master-module according to claim 15, wherein the master-module comprises at least one of the following components:

a) a current demodulator to demodulate a load current provided by the master-module via the two-wire line and to determine data contained therein, b) a filter in order to pass rapidly varying current changes of the load current caused by information-containing current pulses, and to attenuate slowly varying current changes of the load current, a filter outputting a load current signal, c) an amplifier for amplifying the filtered load current signal, d) a detector for comparing the filtered load current signal with at least one predetermined level, e) a pre-state memory for temporarily storing a pre-state of the filtered load current signal determined by the detector, wherein the detector compares a current state of the load current signal with the pre-state of the filtered load current signal stored in the pre-state memory, f) the controllable switch for switching the energy transmission from the master-module to the at least one slave-module during the data transmission from the master-module to the at least one slave-module, g) an output circuit for generating voltage pulses on the two-wire line corresponding to the data to be transmitted to the at least one slave-module, and h) a microprocessor for providing the data to be transmitted to the at least one slave-module and for controlling a transistor or the output circuit corresponding to the data to be transmitted to the at least one slave-module.

17. The master-module according to claim 14, wherein the transmission system is switchable between at least two of the following operating states:

a) the first operating state for energy transmission from the master-module to the slave-module, wherein the changeover switch in the master-module connects the two-wire line to the supply voltage and the switch is closed so that the supply voltage is connected to the two-wire line and supplies the slave-module with current via the two-wire line, b) the second operating state for data transmission from the master-module to the slave-module, wherein the changeover switch in the master-module connects the two-wire line to the supply voltage and the switch modulates the supply voltage corresponding to the data to be transmitted, and c) the third operating state for data transmission from the slave-module to the master-module, wherein the switch in the master-module connects the two-wire line to the receiver and the receiver receives the data sent by the slave-module via the two-wire line.

18. The master module according to claim 14, wherein a) the receiver in the master-module comprises a transistor, which is connected with its base to the two-wire line via the changeover switch, b) the transistor of the receiver in the master-module is connected between the supply voltage and ground, and c) a current limiter is arranged in the master-module between the supply voltage and the transistor.

19. The master module according to claim 14, wherein a) the master-module comprises a controllable first switch which, depending on its controlling, optionally connects the two-wire line to a supply voltage or disconnects the two-wire line from the supply voltage, b) the controllable first switch is closed for an energy transmission from the master-module to the slave-module, c) the controllable first switch is closed and opened for a data transmission from the master-module to the slave-module in time with the data to be transmitted, and d) the controllable first switch is opened for a data transmission from the slave-module to the master-module.

20. The master module according to claim 19, wherein a) the master-module comprises a controllable second switch which, depending on its controlling, optionally connects the two-wire line to the supply voltage via a current limiter or disconnects the two-wire line from the supply voltage, b) the controllable second switch is opened for an energy transmission from the master-module to the slave-module, c) the controllable second switch is opened for a data transmission from the master-module to the slave-module, and d) the controllable first switch is closed for a data transmission from the slave-module to the master-module.

21. A slave-module for a transmission system according to claim 1, wherein the slave-module is switchable between several operating states, the operating states differing with regard to at least one of the following:

the energy transmission; and the data transmission.

22. The slave-module according to claim 21, wherein the slave-module is switchable between at least two of the following operating states:

a) the first operating state;

b) the second operating state; and c) the third operating state.

23. The slave-module according to claim 21, wherein the slave-module comprises at least one of the following components:

a) the energy store in order to supply the slave-module with the energy required for operation during the interruption of the energy transmission from the master-module in the second operating state, b) the discharge protection in order to prevent excessive discharge of the energy store during the interruption of the energy transmission from the master-module in the second operating state, c) a current modulator in order to modulate a load current provided by the master module via the two-wire line corresponding to the data to be transmitted to the master-module, d) a current pulse generator, which modulates the load current provided via the two-wire line in the form of pulses and generates current pulses corresponding to the data to be transmitted to the master-module, e) a transistor, which is connected between the two lines of the two-wire line in order to modulate the load current provided by the master-module via the two-wire line, f) a current limiter in order to limit the load current when the transistor switches through, and g) a microprocessor for controlling the transistor corresponding to the data to be transmitted from the slave-module to the master-module.

24. A transmission method for bidirectional transmitting data and for transmitting energy via a two-wire line between a master-module and a slave-module, the slave module having an energy store for storing the transmitted energy and a discharge protection, wherein at least one of:

a) the master-module comprises a controllable changeover switch which connects the two-wire line in the master-module either to a supply voltage or to a receiver, b) the master-module comprises a controllable switch between the supply voltage and the changeover switch in order to transmit voltage pulses via the two-wire line, c) the slave module contains a voltage detector to detect the voltage pulses sent by the master-module via the two-wire line, and d) the slave-module comprises a current pulse generator to generate current pulses for the data transmission from the slave-module to the master-module, said method comprising:

switching operation of the master module and the slave module between at least two of the following states:

1) a first operating state for energy transmission from the master-module to the at least one slave-module via the two-wire line;

2) a second operating state for data transmission from the master-module to the slave-module via the two-wire line, the energy store supplying the slave module with energy required for operation during restriction or interruption of the energy transmission from the master module in the second operating state and the discharge protection preventing excessive discharge of the energy store during the restriction or interruption of the energy transmission in the second operating state; and 3) a third operating state for data transmission from the at least one slave-module to the master-module via the two-wire line.

* * * * *